United States Patent

[11] 3,596,251

[72] Inventors John S. Buchan;
Frank P. Turpin, both of Ottawa, Canada

[21] Appl. No. 716,034
[22] Filed Mar. 26, 1968
[45] Patented July 27, 1971
[73] Assignee Northern Electric Company Limited
Montreal, Quebec, Canada
[32] Priority Jan. 31, 1968
[33] Canada
[31] 011,203

[54] LOGICAL SHIFTING DEVICE AND METHOD OF SHIFTING
10 Claims, 8 Drawing Figs.

[52] U.S. Cl. ........................................ 340/172.5, 328/37
[51] Int. Cl. ........................................ G06f 7/00, G11c 19/00
[50] Field of Search ........................................ 235/157; 340/172.5, 174 SR; 307/221; 328/37

[56] References Cited

UNITED STATES PATENTS

| | | | |
|---|---|---|---|
| 3,274,556 | 9/1966 | Paul et al. .................... | 340/172.5 |
| 3,374,468 | 3/1968 | Muir .................... | 340/172.5 |
| 3,436,737 | 4/1969 | Iverson .................... | 340/172.5 |

*Primary Examiner*—Paul J. Henon
*Assistant Examiner*—Melvin B. Chapnick
*Attorney*—Craig, Antonelli, Stewart & Hill

ABSTRACT: A logical shifting device having a plurality of levels, each of which includes a left shift logical unit, a no-shift logical unit and a right shift logical unit interconnected by logical circuitry so as to permit a binary word input comprising N+1 binary bits to be shifted left or right by up to N places. During shifting, a binary word passes once through each level and thus the time taken for a shifting operation is constant for all magnitudes of shift.

INVENTORS,
JOHN S. BUCHAN,
FRANK P. TURPIN

INVENTOR,
JOHN S. BUCHAN,
FRANK P. TURPIN

INVENTORS,
JOHN S. BUCHAN,
FRANK P. TURPIN

INVENTORS,
JOHN S. BUCHAN,
FRANK P. TURPIN

INVENTORS,
JOHN S. BUCHAN,
FRANK P. TURPIN

INVENTORS,
JOHN S. BUCHAN,
FRANK P. TURPIN

INVENTORS,
JOHN S. BUCHAN,
FRANK P. TURPIN

INVENTORS,
JOHN S. BUCHAN,
FRANK P. TURPIN

LOGICAL SHIFTING DEVICE AND METHOD OF SHIFTING

This invention relates to improved logical shifting devices and methods of effecting a shifting operation on a binary word.

Shifting devices are used extensively in electronic computers in which a binary word comprises a plurality of binary bits. The shifting devices are sometimes located between two registers and are utilized to shift a word either left or right a required number of places, each place corresponding to one binary bit. However, an inherent property of some previous shifting devices is that the time taken for the binary word to pass through the shifting device is dependent on the number of places of shift and this is, of course, a considerable disadvantage in some applications.

From one aspect of the present invention, it is an object to provide a shifting device in which the above-mentioned disadvantage is obviated or substantially reduced.

Accordingly, there is provided a logical shifting device capable of effecting a shifting operation to shift a binary word comprising (N+1) binary bits, up to N places left or right, including a plurality of logical units at a first level, a further plurality of logical units at least at one further level, and control means for activating a selected one logical unit at each level for each shifting operation of the logical shifting device so that the desired magnitude of shift is achieved and the respective portion of said binary word is passed through one logical unit at each level during the shifting operation, whereby the total time taken by the shifting operation is constant for all such shifting operations.

From another aspect of the present invention, it is an object to provide a method of effecting a shifting operation on a binary word in which the above-mentioned disadvantage is obviated or substantially reduced.

According to this aspect, there is provided a method of effecting a shifting operation on a word, comprising (N+1) binary bits, to shift the word up to N places left or right including the steps of passing the binary word or respective portion thereof through one selected logical unit at a first level, passing the binary word or respective portion thereof through one selected logical unit at least at one further level, and selecting and activating said one selected logical unit at each level for each shifting operation so that the desired magnitude of shift is achieved and the total time taken by a shifting operation is constant for all such shifting operations, the binary word or a respective portion thereof passing through one logical unit at each level.

One embodiment of the present invention will now be described, by way of example, with reference to the accompanying drawings in which.

Figure 1:
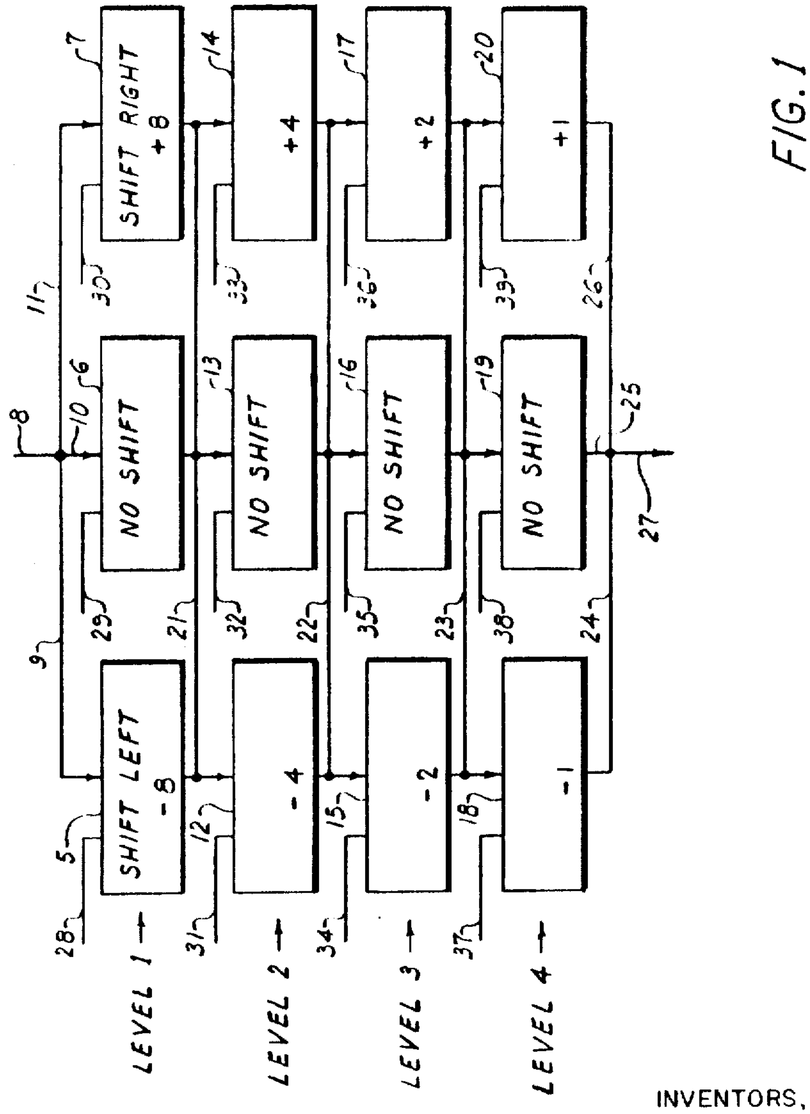
FIG. 1 is a block diagrammatic representation of a shifting device according to the present invention.
Figure 2A:
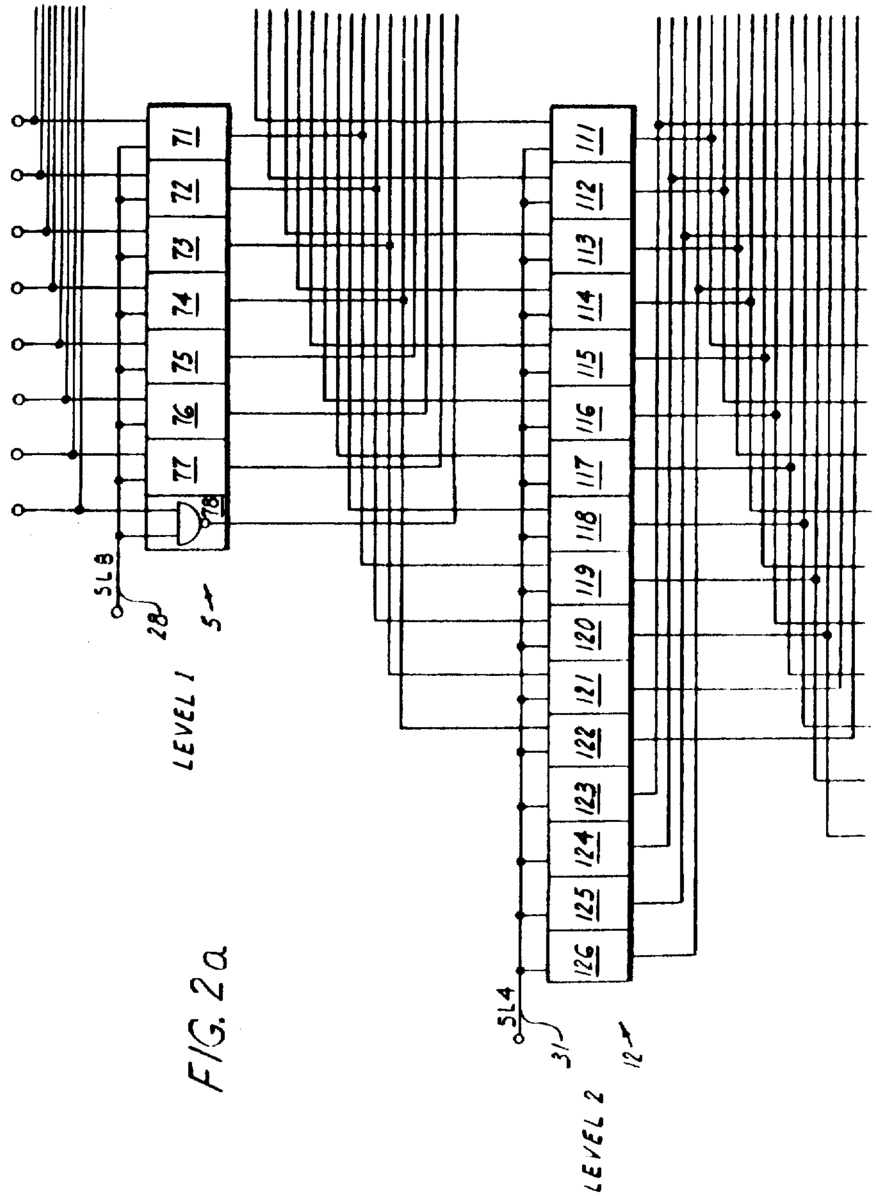
FIG. 2 is made up of FIGS. 2*a*, 2*b*, 2*c*, 2*d*, 2*e* and 2*f* and is a more detailed diagrammatic representation of the shifting device of FIG. 1 to show the logical wiring connections thereof.
Figure 2B:
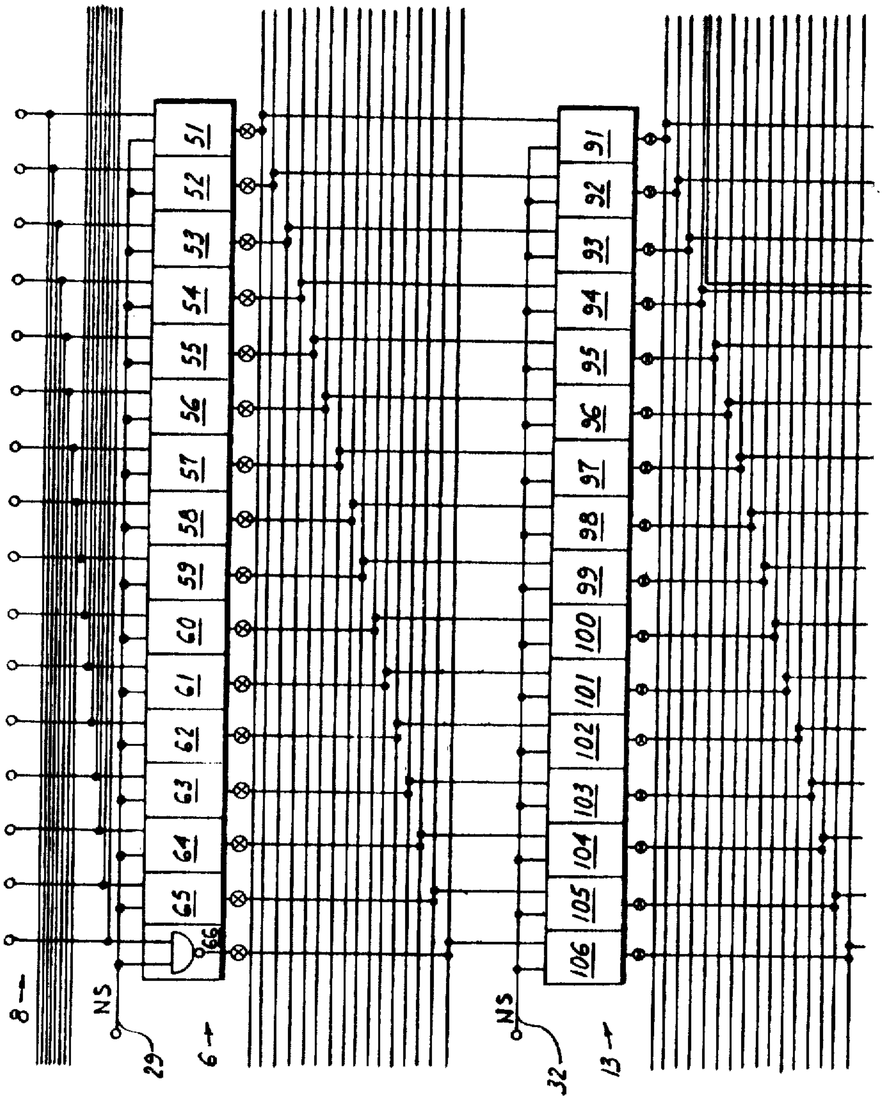
Figure 2C:
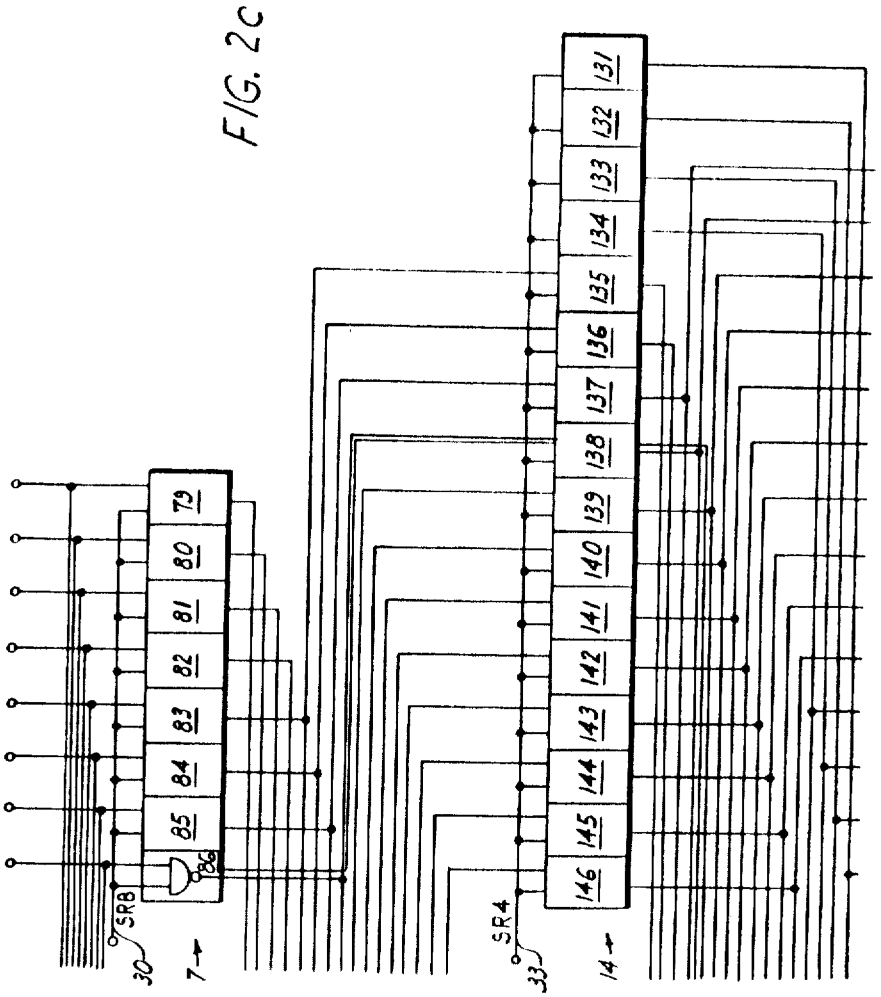
Figure 2D:
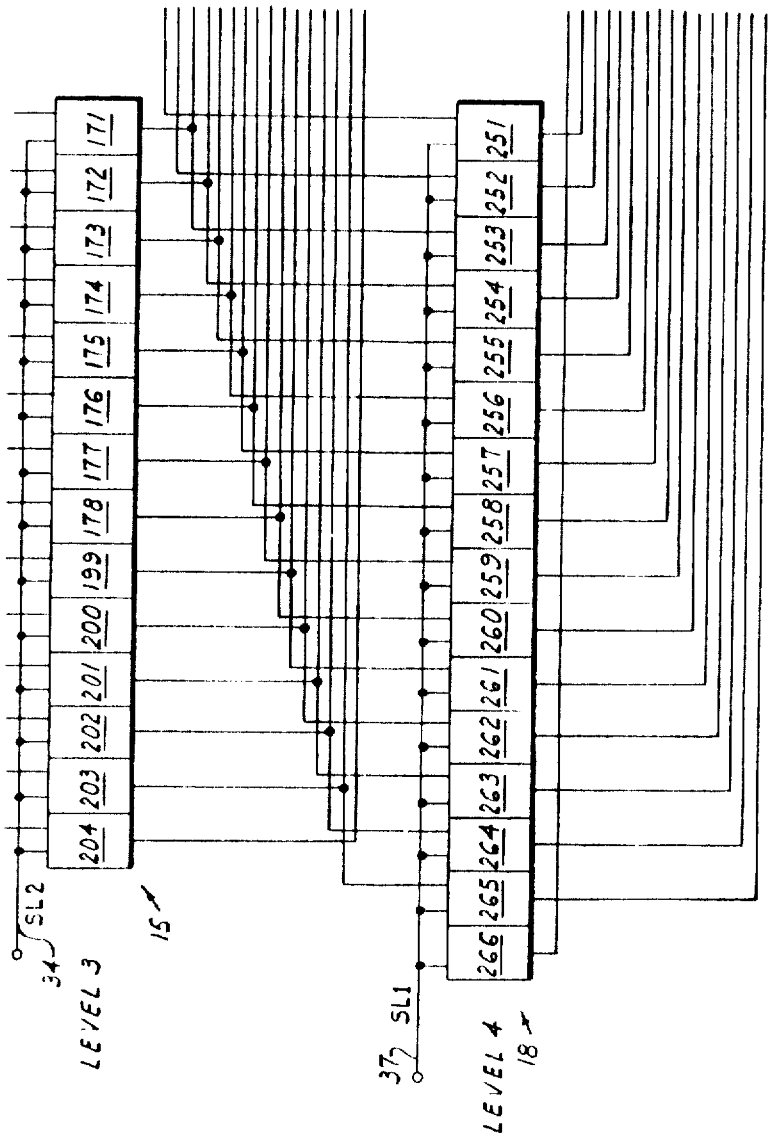
Figure 2E:
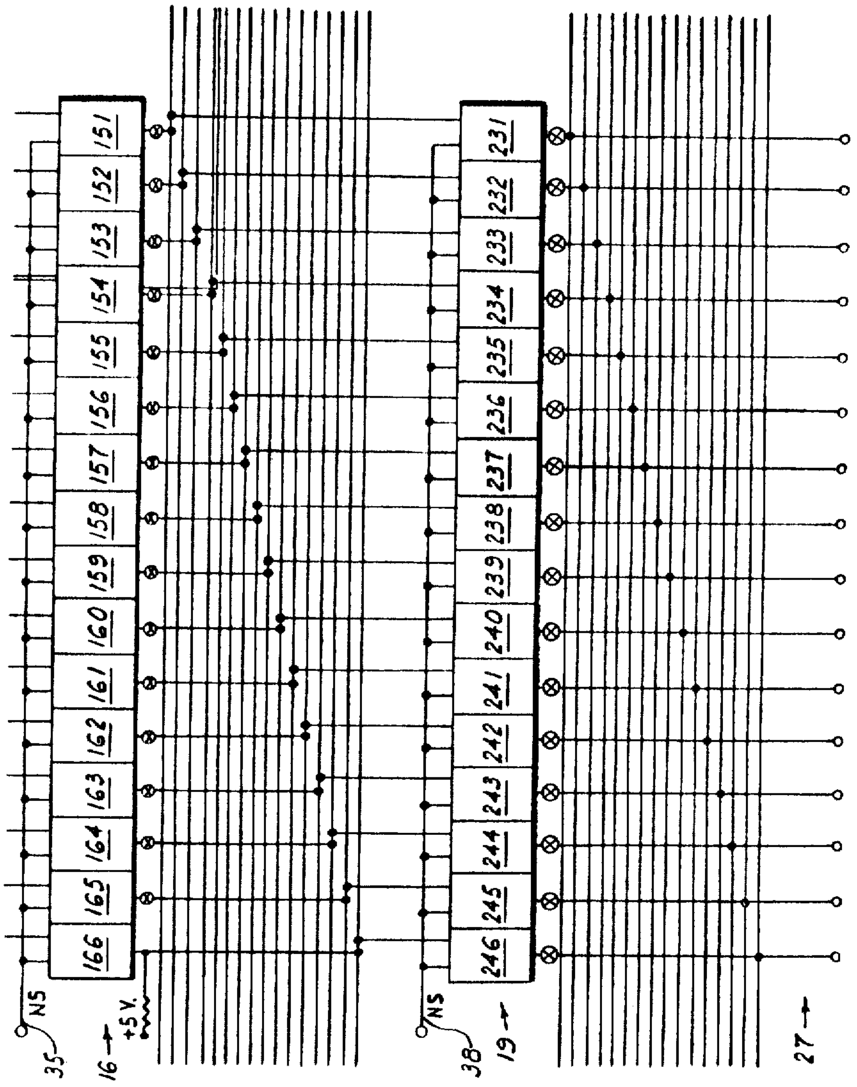
Figure 2F:
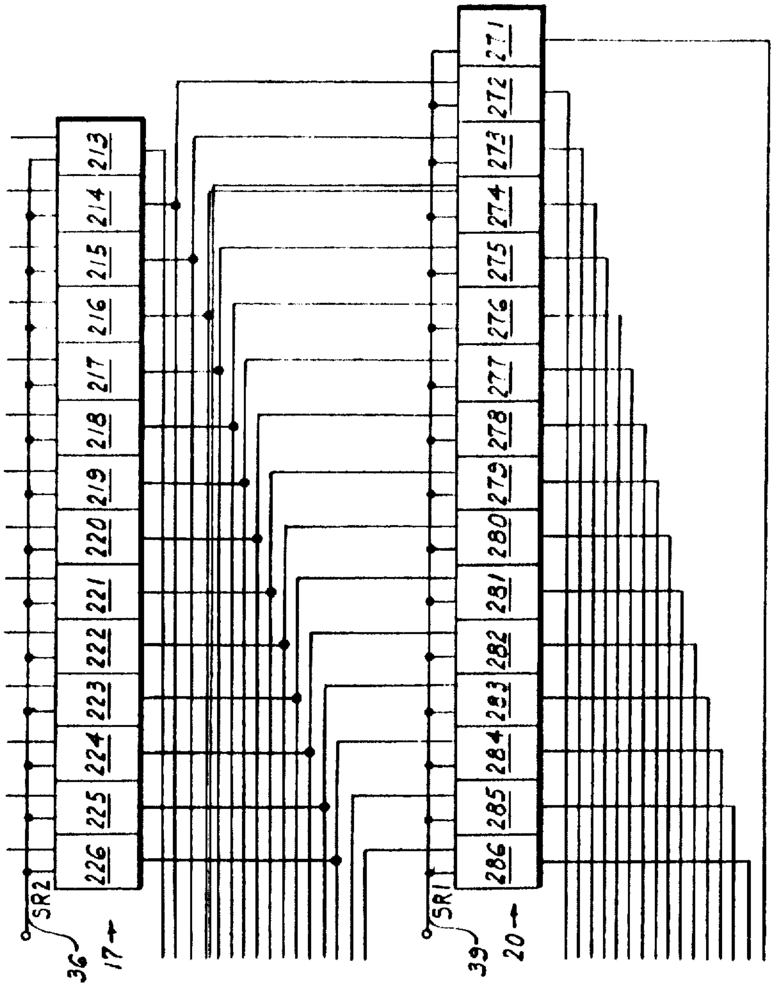

For the purposes of illustration, the logical device illustrated in FIGS. 1 and 2 is designed to handle a binary word comprising 16 binary bits, although it will be appreciated that the invention is equally applicable to any binary word. The device is so designed that it can effect a shift operation on the binary word by up to 15 places left or right. As will be appreciated, a shift of 15 places can be accomplished in four stages, for example, by shifting eight places in one stage, four places in a second stage, two places in a third stage, and one place of shift in a fourth stage. As will be clear from the description below, by means of suitable logical connections, the shifting device illustrated in FIG. 1 can be utilized to effect any shifting operation on a 16 binary word up to 15 places left or right.

Referring to FIG. 1, the logical shifting device comprises four levels, a first level 1, a further level 2, a still further third level 3, and a fourth level 4. The first level 1 includes a plurality of logical units, a logical unit 5 capable of effecting a shift-left of eight places in a binary word, or portion thereof, applied to its input, a logical unit 6 which effects zero shift in an input word which thus appears at its output without a shift, and a logical unit 7 capable of effecting a shift-right of eight places in a binary word applied to its input. For simplicity, a shift-left of eight places is identified herein as a shift of "−8" whilst a shift-right of eight places is identified "+8".

A binary word input to the logical units 5, 6 and 7 is provided by way of a logical input connection 8 which is, as will be seen from FIG. 2, a logical bus comprising 16 input wires. This logical connection 8 is, in turn, connected to the respective logical units by way of connections 9, 10 and 11 which are logically wired in a manner which will be explained below with reference to FIG. 2.

The second or further level 2 includes a further plurality of logical units, a shift-left "−4" logical unit 12, a zero or no-shift logical unit 13, and a shift-right "+4" logical unit 14. The third level 3 includes a shift-left "−2" logical unit 15, a no-shift logical unit 16, and a shift-right "+2" logical unit 17, whilst the fourth level 4 includes a shift-left "−1" logical unit 18, a no-shift logical unit 19, and a shift-right "+1" logical unit 20.

Logical wiring connections are provided between the logical units shown in FIG. 1 and are identified generally by the numerals 21, 22 and 23, whilst the logical output connections from the various units 18, 19 and 20 are identified by the numerals 24, 25 and 26, these logical output connections being connected to a common logical output connection 27.

Control means (not shown) is also provided to activate, by way of control activating connections 28—39, those logical units, one at each level, which are required to produce the desired left or right shift in the binary word input. For example, if a magnitude of shift 10 places to the right is required, then the shift-right "+8" logical unit 7 would be activated, as well as the no-shift unit 13, the shift-right "+2" logical unit 17, and the no-shift unit 19. The total shift would then be a shift to the right having a magnitude +8+0+2+0 equals 10 places to the right, as required.

Similarly, referring to FIG. 1, if a shift-left of five places was required for the binary word input on connection 8, then the logical units which would be activated are the no-shift unit 6, the shift-left "−4" logical unit 12, the no-shift logical unit 16, and the shift-left "−1" logical unit 18. Thus, the total shift would be 0−4+0−1 equals minus five places to the left.

From the above description with reference to FIG. 1, it will be clear that the control means activates a selected one of the logical units at each level for each shifting operation of the logical shifting device, no matter what the desired magnitude of shift up to the maximum of 15 places left or right. Thus, since the binary word or respective portion thereof passes always through one logical unit at each of the levels 1, 2, 3 and 4, the total time taken by a shifting operation is constant for all the shifting operations for which the logical shifting device is designed.

Figure 3:
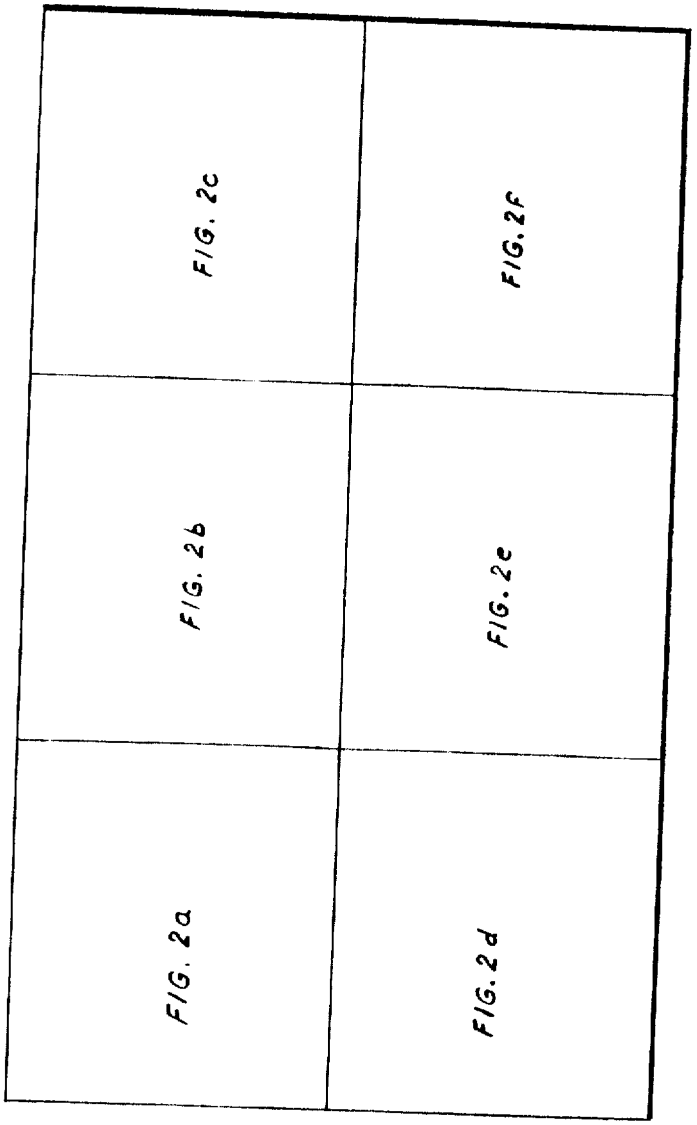
FIG. 3 illustrates the relative positions in which FIGS. 2*a*, 2*b*, 2*c*, 2*d*, 2*e* and 2*f* must be placed to form FIG. 2.

The construction of the logical shifting device illustrated in FIG. 1 can be better understood by reference to FIG. 2 which comprises FIGS. 2*a*, 2*b*, 2*c*, 2*d*, 2*e* and 2*f* arranged as in FIG. 3. For convenience, wherever possible, the same reference numerals have been used on like parts in FIG. 2 as were used in FIG. 1.

Referring to FIG. 2, it will be seen that the logical units 5, 6, 7, 12, 13, 14, 15, 16, 17, 18, 19 and 20 of FIG. 1 are shown in greater detail.

It should, first of all, be explained that a binary word is assumed to comprise 16 binary bits. If the binary word is to be passed through the logical shifting device without any shift being introduced, then obviously it must only pass through the logical units 6, 13, 16 and 19 of FIG. 1, and therefore, these logical units must be capable of handling 16 binary bits in the binary word. Thus, referring to FIG. 2, it will be seen that the logical shifting unit 6 comprises 16 individual logical stages numbered 51—66, each of which is capable of handling one binary bit in the 16-bit binary word. Each of the logical stages 51 —66 is, in the present embodiment, a NAND gate having two-input connections, a first information input connection and a second control input connection, and a single output connection. By way of illustration, a logical symbol representing a NAND gate is indicated, in FIG. 2, on the logical stage 66. The circuit illustrated in FIG. 2 operates with positive logic, i.e. a binary "1" level is represented by plus 5 volts on any connection, whilst a binary "0" level is represented by ground potential on any connection. A NAND gate, such as 66, comprises an AND gate followed by an inverter and therefore when a binary "1" is applied to its information input and a positive potential to its control input connection, it will provide a zero binary "0" output voltage. Similarly, when the voltage potentials applied to inputs are unequal or are at zero, binary "0", then the output from the NAND gate will be at plus 5 volts representing a binary "1". In other words, whenever a control voltage is applied to the control input potential of a NAND gate, the output of the NAND gate is opposite to its input, a binary "1" resulting in a binary "0" output and a binary "0" input resulting in a binary "1" output.

Referring to FIG. 2, it will be seen that the logical input connection 8 comprises 16 input wires, one to each logical stage 51 —66. The respective control activating connection 29 is connected to each of the logical stages 51 —66 to comprise the second or control input thereto. For identification purposes, the control activating connection 29 has been labeled "NS."

The no-shift logical units 13, 16 and 19 are identical to the logical unit 6 and each comprises 16 NAND gates as illustrated in 0, block diagrammatic form in FIG. 2. The logical wiring connections between the different logical units are clearly illustrated in FIG. 2 and if a binary number appears at the input connection 8 and requires no shift, then it will be seen that by activating the control activating connections 29, 32, 35 and 38, the binary word input may be passed straight through the logical device without any shift being introduced. The logical wiring used can be simply traced from FIG. 2, from whence it will be seen that the common logical output connection 27 comprises 16 output wires, each connected to the output of a different one of the logical stages comprising the logical unit 19. For identification purposes, the control activating connections 32, 35 and 38 have been labeled "NS."

The described embodiment of the present invention has been designed to handle 16-bit binary words in which the least significant digit (bit) is on the right and the most significant digit on the left.

The logical unit 5 is identified as the shift left "—8" unit and its output will be the eight remaining digits in the binary word input after a shift of eight places to the left. It will thus be appreciated that the eight binary bits making up the left half of the binary word input can be disregarded and therefore the logical unit 5 need only comprise eight NAND gates, 71—78, in the described embodiment of FIG. 2 in which those bits which are not required are dropped. The information input connection to the logical stage 71 is connected to the input connection to the logical stage 51 of the logical unit 6 whilst the information input connections to the logical stages 72—78 are similarly connected to the information input connections of the logical stages 52—58.

In a similar manner, the remaining logical unit 7 (shift-right "+8") comprises eight logical NAND stages 79 —86. In shift-right operation, one is not concerned with the eight digits in the right-hand side of a 16-bit binary word and thus they can be neglected in a shift-right operation. Therefore, the information input connections to the logical stages 79—86 are merely connected to the information input connections of the logical stages 59—66 of logical unit 6 as will be clear from FIG. 2. It will be seen that the control activating connection 30 is identified as "SR," an abbreviation of shift-right 8, whilst the control activating connection 28 is identified as "SL8" being an abbreviation of shift-left 8.

At level 2, the no-shift logical unit 13 comprises 16 NAND gates, i.e. logical stages, 91—106. Level 2 includes the logical units for providing four places of shift left or right and it will be seen that the shift-left "—4" logical unit 12 includes two-input NAND gate logical stages 111—122. Logical unit 12 also includes four single input logical stages 123—126. These stages which are designed as one-input gates are sometimes referred to as cancelling gating stages and are capable of providing a zero level output whenever their single input connection is activated. Their single input connection is connected to the control activating connection 31 which is also connected to the control connection of each of the NAND gates 111—122. The latter gates also have an information input connection which is connected to receive information pulses from the respective logical units in level 1.

In a similar manner, the logical unit 14 at level 2 includes four single input logical gate stages 131—134 (cancelling gates) together with a plurality of two-input NAND gates 135—146. The control activating connection 33 "SR4" (shift-right four places) is connected to the control input of the NAND gates 135—146 and also to the single input of the gates 131—134 so that the stages in the unit 14 operate in the same manner as the stages in the logical unit 12. The reason for providing the single input gates will be explained below.

At level 3, the logical units 15, 16 and 17 are provided. The no-shift logical unit 16 includes 16 NAND gates 151—166, the left shift "—2" logical unit 15 includes NAND gates 171—178 and 199—204 whilst the shift-right "+2" logical unit 17 includes NAND gates 213——226. The control activating connections 34, 35 and 36 at level 3 are identified as "SL2" (shift-left minus two), "NS" (no-shift), and "SR2" (shift-right plus two).

Each of the output connections of the logical units 13 and 16 in FIG. 2 will be seen to include a symbol in the form of a small circle containing two crossed lines. This represents a pullup resistor, always found in NAND or NOR circuits, sometimes internal with a commercial package and sometimes external to the commercial package and having to be separately provided. Such a resistor is indicated at the output connection of the logical stage 166 but for simplicity is only represented in symbolic form at some of the other output connections. All the NAND gates will, of course, have either external or internal pullup resistors. It will furthermore be appreciated that, in practice, test jacks may be provided on any of the connection wires in the logical shifting device.

Level 4 includes the shift-left "—1" logical unit 18, the no-shift logical unit 19, and the shift-right "+1" logical unit 20. The logical unit 19 includes two-input NAND gates 231—246 whilst the logical unit 18 includes two-input NAND gates 251—265. Logical unit 18 also includes one single input logical gate 266 and, as may be seen, the control activating connection 37, SL1 (shift-left minus one) is connected to the control input of all the stages 251—266. Similarly, the logical unit 20 at level 1 includes a single input gate 271 of the type referred to above together with two-input NAND gates 272—286. The control activating connection 39 SR1 (shift-right plus one) is connected to all the logical stages 271—286 whilst the information input connection to the NAND gates 272—286 are connected as illustrated in FIG. 2.

The output connections from the logical units 18, 19 and 20 at level 4 are connected as shown to the respective output wires of the common logical output connection 27.

As mentioned above, the logical stages 123 through 126 and 131 through 134 at level 2 have no information input but only one input from the respective control activating connections 31 and 33. They are designed to give a zero output on their output connection, upon activation of the respective control activating connection, so that the binary word, or a portion thereof, input to the succeeding stages on level 3 has the correct number of digits. As will be seen, stages 123 through 126 upon activation supply zero inputs to stages 151 through 154 and stages 171 through 174, whilst stages 131 through 134 supply inputs to stages 223 through 226 and stages 163 through 166 when the respective level 2 control activating connections are activated. This is particularly necessary when one considers the conditions which exist when all the wires of the logical input connection 8 carry a binary "1" so that all the NAND gates 51 through 66 are enabled due to the presence of an activating potential on the activating connection 29. In such a case, all the outputs of the NAND gate stages 51 through 66 would drop to ground level potential representing binary "0." If at the next level 2, it was necessary to introduce a shift of four places to the right in the binary word, then the control activating connection 33 (SR4) would be activated by being placed at a "1" level having a relatively high positive potential thereon. However, as mentioned, the outputs of the logical gate stages 51 through 66 would be at zero and, therefore, zero voltage, i.e. ground level, would be applied to the information input connections of stages 135 through 146. The two inputs to those stages would thus be unequal and the stages would give a high potential output, representing binary "1." Similarly, since the output voltages of stages 51 through 66 are applied via the logical wiring to the information input connections of stages 91 through 106 and stages 111 through 122, a low potential would thus be applied to the information input of those stages. However, their respective control activating connections 31 and 32 would be at a low potential and, therefore, the respective stages would not be activated and would all provide a high potential, representing binary "1," which would also be applied to the input connections of stages 151 through 166 of logical unit 16. That logical unit would thus not be able to differentiate between the output of the activated logical unit 14 and the nonactive logical units 12 and 13. Therefore, what is really an intelligible output from the logical unit 14 is rendered unintelligible due to the residual conditions in the logical units 12 and 13, and the shift-4-right function would thereby be cancelled out at the level 3 of the logical shifting device. To overcome this, the single input gates 131 through 134 are provided in the logical unit 14 so as to each give a binary "0," i.e. ground potential, output whenever the SR4 control activating connection 33 is activated. The ground potential thereon thus ensures that the information input connections to the four most significant stages 163 through 166 of logical unit 16 are at zero whenever activating connection 33 is activated.

Similarly, the logical unit 12 is provided with the four single input stages 123 through 126 whereby whenever the control activating connection 31 is activated, zero output voltage is applied to the information inputs of stages 171 through 174 of the shift-left minus two logical unit 15 and also to the stages 151 through 154 of the no-shift logical unit 16. The operation of this part of the circuit, to ensure that the information passing through the circuit is intelligible will be clear from a study of the logical diagram shown in FIG. 2. Stages 151 through 154 and 171 through 174 correspond, of course, to the four least significant bits of the binary word or portion thereof.

It is to be observed that at level 4, the logical unit 18 is also provided with a single input gate stage 266 whose output is connected to the least significant digit wire of the common logical output connection 27. The logical unit 20 also includes a single input stage 271 whose output is connected to the most significant digit wire of the common logical output connection 27. Stages 266 and 271 function in a similar manner to the single input stages at level 2 so as to present an intelligible binary word output having 16 bits.

Whilst the operation of the logical shifting device illustrated in FIGS. 1 and 2 should be clear from the above description, it may well be that an understanding thereof may be facilitated from a consideration of the passage of a binary word through the logical device to produce a particular magnitude of shift.

Let us assume that it is required to introduce a shift of 13 places to the right in a binary word and let it be assumed that the 16-bit binary word applied to the logical input connection 8 is:

1 0 1 0 1 1 1 0 1 0 1 1 1 1 1 1.

For a 13 position shift to the right, the output binary wo[rd] on the common logical output connection 27 should obvious[ly] be:

0 0 0 0 0 0 0 0 0 0 0 0 0 1 0 1.

A 13 position shift to the right can be formed from successive shifts +8, +4, +0, +1=13. Therefore, control voltag[es] must be applied to:

1. control activating connection 30 (SR8) of the shift rig[ht] +8 logical unit 7;
2. control activating connection 33 (SR4) of the shift rig[ht] +4 logical unit 14;
3. control activating connection 35 of the no-shift logica[l] unit 16; and
4. control activating connection 39 of the shift right +1 logical unit 20.

The control activating connections may be activated i[n] sequence provided they are left on, or simultaneously—provided that the control voltages are of sufficient width to permi[t] the binary word, or portion thereof, to pass therethrough.

The binary word input signal will be applied to the inpu[t] connection 8 but since the control connections 28 and 29 ar[e] not activated, i.e. enabled, there will be no output from the shift left −8 logical unit 5 and the no-shift logical unit 6. However, control activating connection 30 of the logical unit 7 is activated and, therefore, the shift right +8 logical unit 7 will produce an output. The binary input to the information input connections of the binary stages 86 through 79 will thus be:

1 0 1 0 1 1 1 0.

Therefore, the respective NAND gate stages will provide an output:

0 1 0 1 0 0 0 1.

As will be clear, the eight least significant digits on the wires of the input connection 8 are not applied to logical unit 7 and thus result in no output therefrom.

The output from the logical unit 7 is applied to the input of the shift right +4 logical unit 14 (in fact, to all the logical units 12, 13 and 14 at level 2 but only logical unit 14 has it control connection activated) but it will be seen that, in fact, only the four most significant outputs from logical unit 7 are applied to logical unit 14 because of the shift right +4 operation. The four least significant digits have been lost on the shift-right +4 operation, as would be expected.

The significant input to the logical unit 14 is thus the portion of a binary word, 0 1 0 1 and the respective NAND gates 138 through 135 thus produce an output 1 0 1 0.

However, eight NAND gate logical stages 139 through 146 are also provided which are activated, i.e. enabled and, therefore, they provide a "0" output so that the output from the stages 146 through 135 of the shift right +4 logical unit is:

0 0 0 0 0 0 0 0 1 0 1 0.

This output is applied to the input of the no-shift logical unit 16.

It should be mentioned that the progress of the most significant digit in the binary word has been indicated in its passage between logical unit 7, logical unit 14, logical unit 16 and logical unit 20 by identifying the wires used with a double line.

Up to the input to the logical unit 16, there has been a total shift of +12 to the right and, therefore, the input to the no-shift logical unit 16, taking into account the operation of stages 131 through 134, will be:

0 0 0 0 0 0 0 0 0 0 0 0 1 0 1 0.

Eight of the zeros are provided by the stages 139 through 146 of unit 14 since their control input 33 is activated by a positive voltage and their signal inputs are also high, at a positive voltage, because the output from the logical units 5 and 6 is high, representing "1," because there is no activating potential on the respective activating connections 28 and 29 even though there may be an information input to the respective units. The output from the logical stages 139 through 146 is thus "0" and this output is supplied to the input connections of the logical stages 155 through 162 of the no-shift logical unit 16, as will be clear from the logical wiring shown in FIG. 2. In order to provide a further four zeros, as required in the binary word input to the logical unit 16, the four stages 131 through 134 of logical unit 14 are activated and provide a "0" input to the logical stages 163 through 166 of logical unit 16. Thus, the correct zeros are provided on the input to the no-shift logical unit 16 whose output (except for stage 151) is applied to the input of the shift right +1 unit whose control activating connection 39 "SR1" is activated.

The input to the shift right +1 logical unit 20 is thus:

1 1 1 1 1 1 1 1 1 1 1 1 1 0 1 0, and its output becomes:

0 0 0 0 0 0 0 0 0 0 0 0 0 1 0 1.

An additional zero is introduced by the last stage 271 of logical unit 20 so as to provide a zero output on the most significant digit wire of the common logical output connection 27 whereby the final output from the logical device is:

0 0 0 0 0 0 0 0 0 0 0 0 0 1 0 1.

A shift of 13 places to the right has, therefore, been produced.

In the above-described embodiment of FIGS. 1 and 2, those bits in the input binary word which do not appear in the output binary word are dropped (i.e. a so-called off-the-end shifting device). However, it will be appreciated that the invention is equally applicable to a system in which those bits are recirculated and reinserted in an end-around shifting operation—as in a so-called end-around shifting device.

It will be appreciated that a device according to the present invention may be conveniently constructed by utilizing, for example, NOR gates instead of the NAND gates.

MATHEMATICAL CONSIDERATIONS

The number of logical gating stages, not counting possible cancelling gates, required at each level and the number of levels required in a shifting device according to the described embodiment of the present invention can be calculated mathematically as follows:

Let $t$ = the number of levels required in the shifting device.

If the binary word to be shifted has a word length of (N+1) bits, then "$t$" must satisfy the equation:

$$2^{t-1}<N+1\leq 2^{t}$$

where $t$ is the smallest integer which satisfies the equation.

Thus the number of levels "$t$" can be calculated. The number of stages in the no-shift logical units will be ($N$+1) at each level but it is necessary to calculate the number of stages in shift-left and shift-right logical units at each level. The required number of positions of shift-left or right will be as follows:

The first level would introduce a shift of $2^{t-1}$ positions left or right.

The second level would introduce a shift of $2^{t-2}$ positions left or right.

The $p^{th}$ level would introduce a shift of $2^{t-p}$ positions left or right.

The $t^{th}$ level would introduce a shift of $2^{t-t}$ positions left or right.

Let $L$ be the general representation for the number of gating stages in the shift-left logical units, a suffix being used to identify the level.

Let $R$ be the general representation for the number of gating stages in the shift-right logical units, a suffix being used to identify the level.

Neglecting cancelling gates for the moment and considering only the active shifting gates at each level, the shifting device will be constructed as follows, the number of logical stages in the logical units at each level being indicated within the respective box

| | | | |
|---|---|---|---|
| 1st Level | $L_1=2^t-2^{t-1}$ | $N+1$ | $R_1=2^t-2^{t-1}$ |
| 2nd Level | $L_2=2^t-2^{t-2}$ | $N+1$ | $R_2=2^t-2^{t-2}$ |
| $p^{th}$ Level | $L_p=2^t-2^{t-p}$ | $N+1$ | $R_p=2^t-2^{t-p}$ |
| $t^{th}$ Level | $L_t=2^t-2^{t-t}$ | $N+1$ | $R_t=2^t-2^{t-t}$ |

The general $p^{th}$ level is indicated.

The table above gives the number of active logical stages required in the logical units at each level. In practice, the shifting device will usually require additional logical stages whose number and/or type will depend on the type of shifting device.

To consider this in greater detail for the two types of shifting devices mentioned:

1. End-around shifting device;

If the shifting is an end-around shifting device, as referred to above, then the total number of logical stages in each logical unit will be ($N$+1), i.e. $L_1=L_2=L_p=L_t=R_1=R_2=R_p=R_t=(N+1)$.

2. Off-the-end shifting device—cancelling gates requirement.

The shifting device illustrated in FIGS. 1 and 2 is of the type where those input bits which do not appear in the output binary word are dropped and wherein cancelling gates 123—126 and 134—131 are provided at the second level whilst cancelling gates 266 and 271 are provided at the fourth level. In this type of "off-the-end" shifting operation, the shift-left and shift-right logical units at the second level will require cancelling gates, or their equivalent, and cancelling gates, or their equivalent, will also be required at every successive alternate level thereafter. The number of cancelling gates required in a logical unit is the difference between the number of active logical stages in that logical unit and the number of active logical stages in the corresponding logical unit in the immediately preceding level.

Let $L$ and $R$ have the same significance as previously and let $Lc$, $Rc$ be the general representations for the number of cancelling gates required in the logical units at a particular level, a suffix being used to identify the level. The "off-the-end" shifting device can then be constructed generally as follows:

| | | | | | |
|---|---|---|---|---|---|
| 1st Level | | $L_1$ | $N+1$ | $R_1$ | |
| 2nd Level | $Lc_2=L_2-L_1$ | $L_2$ | $N+1$ | $R_2$ | $Rc_2=R_2-R_1$ |
| $p^{th}$ Level | $Lc_p=L_p-L_{p-1}$ | $L_p$ | $N+1$ | $R_p$ | $Rc_p=R_p-R_{p-1}$ |
| $t^{th}$ Level | $Lc_t=L_t-L_{t-1}$ | $L_t$ | $N+1$ | $R_t$ | $Rc_t=R_t-R_{t-1}$ |

At the $p^{th}$ and $t^{th}$ levels, cancelling gates are, of course, only required if those levels are even numbered. $L_{p-1}$ and $R_{p-1}$ are, of course, the representations for the number of stages in the shift-left logical unit and the shift-right logical unit respectively at the ($p$—1) level. Similarly, $L_{t-1}$ and $R_{t-1}$ are the representations for the number of stages in the shift-left logical unit and the shift-right logical unit respectively at the ($t$—1) level.

By way of example, let us consider the shifting device of FIGS. 1 and 2. Here, it was required to shift a binary word comprising 16 binary bits by up to 15 places left or right.

Therefore, $N$+1=16; $N$=15.

The equation to be satisfied is:

$$2^{t-1}<N+1\leq 2^{t}$$

giving $t$=4.

Thus the shifting device will include logical units at four levels and the number of logical stages in each logical unit can be calculated as follows:

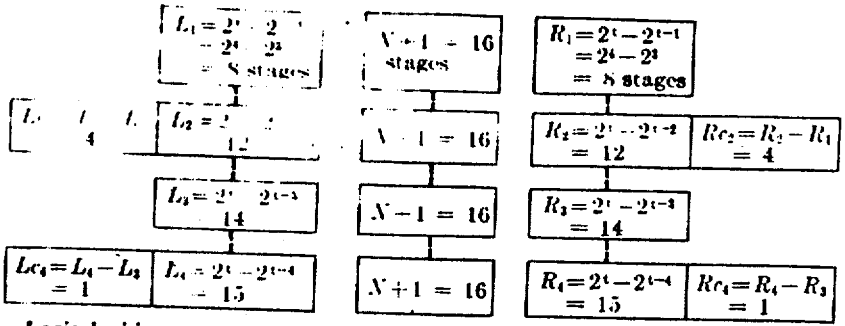

Logical wiring can now be provided between the various logical units, as shown in FIG. 2, together with the required activating connections.

The described logical shifting device according to the present invention may well have application in the arithmetic unit of computer, for example, a commercial digital computer or a special purpose digital computer—such a computer may already be provided with the "no-shift" gates in its standard circuitry and it will therefore only be necessary to provide the shift-left and shift-right gates. However, it will be appreciated that the invention is not restricted thereto but may equally have application, for example, in telephone switching circuits. The type of structure referred to should be applicable to large-scale integration techniques.

Furthermore, while the invention has been described with reference to preferred embodiments thereof, other variations in the circuits will occur to those skilled in the art and may be incorporated without departing from the spirit or scope of the invention.

We claim:

1. A logical shifting device capable of effecting a shifting operation to shift a binary word, comprising ($N$+1) bits, up to N places left or right including:

a. a plurality of logical units at a first level and a further plurality of logical units at least at one further level; each level comprising a shift-left logical unit having logical gating stages with inputs interconnected through logical connections to the outputs of logical gating stages in the immediately preceding logical unit to produce a desired shift left in a respective portion of the binary word, a no-shift logical unit having logical gating stages with inputs interconnected through logical connections to the outputs of logical gating stages in the immediately preceding logical unit to pass the respective portion of the binary word therethrough with zero shift, and a shift-right logical unit with inputs interconnected through logical connections to the outputs of logical gating stages in the immediately preceding logical unit to produce a desired shift right in the respective portion of the binary word;

b. control means for activating a selected one logical unit at each level for each shifting operation of the logical shifting device so that the desired magnitude and direction of shift is achieved at each level and the respective portion of said binary word is passed through one logical unit at each level during the shifting operation; whereby the total time taken by a shifting operation is constant for all such shifting operations.

2. A logical shifting device according to claim 1 having a first level and at least two further levels, wherein each level includes:

a. a shift-left logical unit logically connected in the device to produce a desired shift left in the respective portion of said binary word;

b. a no-shift logical unit logically connected in the device to pass the respective portion of said binary word therethrough with zero shift; and c. a shift-right logical unit logically connected in the device to produce a desired shift right in a respective portion of said binary word.

3. A logical shifting device according to claim 1 for effecting a shifting operation to shift a binary word, comprising 16 bits, up to 15 places left or right, including four levels wherein:

a. the first level comprises:

i. a shift-left logical unit having eight logical gating stages, ii. a no-shift logical unit having 16 logical gating stages, and iii. a shift-right logical unit having eight logical gating stages;

b. the second level comprises:

i. a shift-left logical unit having 12 logical gating stages and four cancelling gating stages, ii. a no-shift logical unit having 16 logical gating stages, and iii. a shift-right logical unit having 12 logical gating stages and four cancelling gating stages;

c. the third level comprises:

i. a shift-left logical unit having 14 logical gating stages, ii. a no-shift logical unit having 16 logical gating stages, and iii. a shift-right logical unit having 14 logical gating stages; and d. the fourth level comprises:

i. a shift-left logical unit having 15 logical gating stages and one cancelling gating stage, ii. a no-shift logical unit having 16 logical gating stages, and iii. a shift-right logical unit having 15 logical gating stages and one cancelling gating stage.

4. A logical shifting device according to claim 3 wherein each of said logical gating stages is a logical NAND gate and the cancelling gating stages each comprise a single input gate capable of providing a zero output in response to an activating input.

5. A logical shifting device according to claim 1 wherein each logical gating stage is a logical NAND gate.

6. A logical shifting device capable of effecting a shifting operation to shift a binary word, comprising (N+1) bits, up to N places left or right including:

a. a plurality of levels of logical units, each unit comprising a number of logical gating stages, the number of levels t being determined by the equation:

$$2^{t-1}<N+1\leq 2^t$$

where $t$ is the smallest integer which satisfies the equation, and in which:

b. the logical units at each level after the first are logically connected to the logical units at the immediately preceding level;

c. each level comprising a shift-left logical unit having logical gating stages with inputs interconnected through logical connections to the outputs of logical gating stages in the immediately preceding logical unit to produce a desired shift left in a respective portion of the binary word, a no-shift logical unit having logical gating stages with inputs interconnected through logical connections to the outputs of logical gating stages in the immediately preceding logical unit to pass the respective portion of the binary word therethrough with zero shift, and a shift-right logical unit with inputs interconnected through logical connections to the outputs of logical gating stages in the immediately preceding logical unit to produce a desired shift right in the respective portion of the binary word;

d. the number of logical gating stages in the shift-left logical units at a particular level being dependent on the level whereby at the general ($p$) th level the number of logical stages is given by $$L_p=2^t-2^{(t-p)};$$

e. the number of logical gating stages in the no-shift logical unit being ($N+1$) for each level;

f. the number of logical gating stages in the shift-right logical units being dependent on the level whereby at the general ($p$) th level the number of logical stages is given by:

$$R_p=2^t-2^{(t-p)};\text{ and}$$

g. control means for activating a selected one logical unit at each level for each shifting operation of the logical shifting device so that the desired magnitude of shift is achieved and a respective portion of said binary word is passed through one logical unit at each level during the shifting operation; whereby the total time taken by a shifting operation is constant for all such shifting operations.

7. A logical shifting device according to claim 6 which is an off-the-end shifting device and in which:

a. the shift-left logical unit and the shift-right logical unit at the second level and at every succeeding alternate level each include a number of cancelling gate stages;

b. the number of said cancelling gate stages at a particular level being dependent on the level whereby at the ($p$) th level the number of cancelling gates in the shift-left logical unit is $Lc_p=(L_p-L_{p-1})$ cancelling gate stages, and the number of cancelling gates in the shift-right logical unit is $Rc_p=(R_p-R_{p-1})$ cancelling gate stages, where the ($p-1$) th level immediately precedes the ($p$) th level.

8. A logical shifting device according to claim 7 for effecting a shifting operation to shift a binary word, comprising 16 bits, up to 15 places left or right, including four levels wherein:

a. the first level comprises:
   i. a shift-left logical unit having eight logical gating stages,
   ii. a no-shift logical unit having 16 logical gating stages, and
   iii. a shift-right logical unit having eight logical gating stages;

b. the second level comprises:
   i. a shift-left logical unit having 12 logical gating stages and four cancelling gating stages,
   ii. a no-shift logical unit having 16 logical gating stages, and
   iii. a shift-right logical unit having 12 logical gating stages and four cancelling gating stages;

c. the third level comprises:
   i. a shift-left logical unit having 14 logical gating stages,
   ii. a no-shift logical unit having 16 logical gating stages, and
   iii. a shift-right logical unit having 14 logical gating stages; and d. the fourth level comprises:
   i. a shift-left logical unit having 15 logical gating stages and one cancelling gating stage,
   ii. a no-shift logical unit having 16 logical gating stages, and
   iii. a shift-right logical unit having 15 logical gating stages and one cancelling gating stage.

9. A logical shifting device according to claim 6 wherein the total number of logical stages in each logical unit is ($N+1$) to provide an end-around shifting device in which those bits which do not appear in the output binary word are recirculated and reinserted in an end-around shifting operation.

10. A method of effecting a shifting operation on a binary word, comprising ($N+1$) binary bits, to shift the word up to N places left or right including the steps of:

a. passing the binary word, or a respective portion thereof, through one selected logical unit at a first level;

b. passing the binary word or a respective portion thereof through one selected logical unit at least at one further level; and c. selecting and activating said one selected logical unit at each level for each shifting operation to pass the binary word through either a shift-left logical unit, a no-shift logical unit, or a shift-right logical unit at each level so that the desired magnitude and direction of shift is achieved at each level and the total time taken by a shifting operation is constant for all such shifting operations, the binary word or a respective portion thereof passing through one logical unit at each level.